3 Sheets—Sheet 1.
G. W. SHARP.
Bee-Hive.
No. 223,067. Patented Dec. 30, 1879.
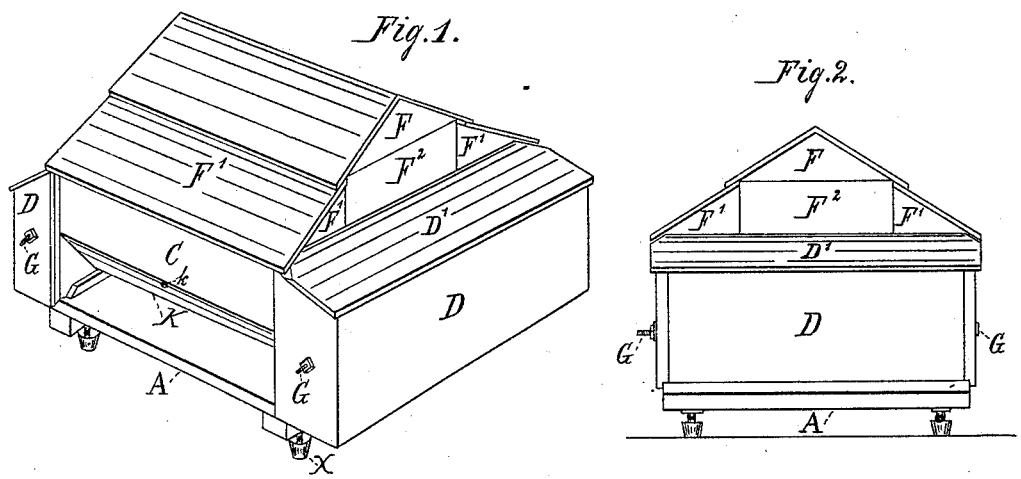
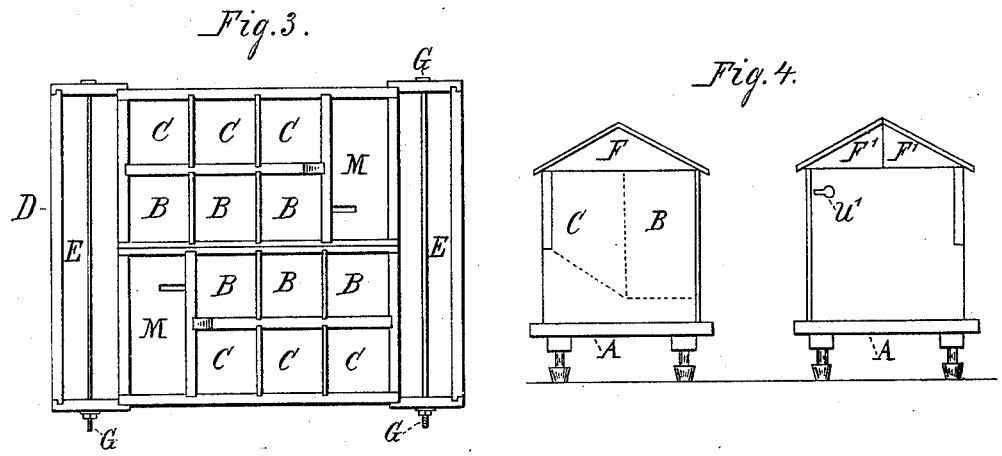
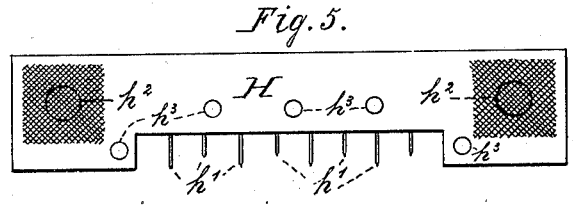
WITNESSES.
James B. Lizius,
R. P. Daggett
INVENTOR.
George W. Sharp,
PER
C. Bradford,
ATTORNEY.

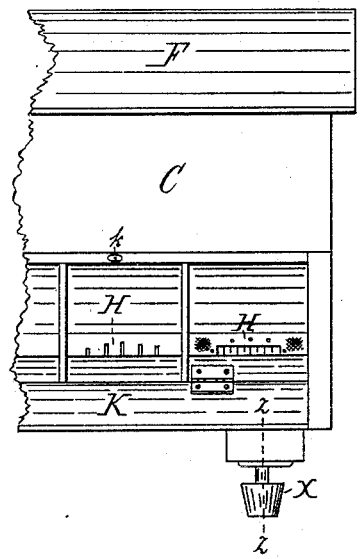
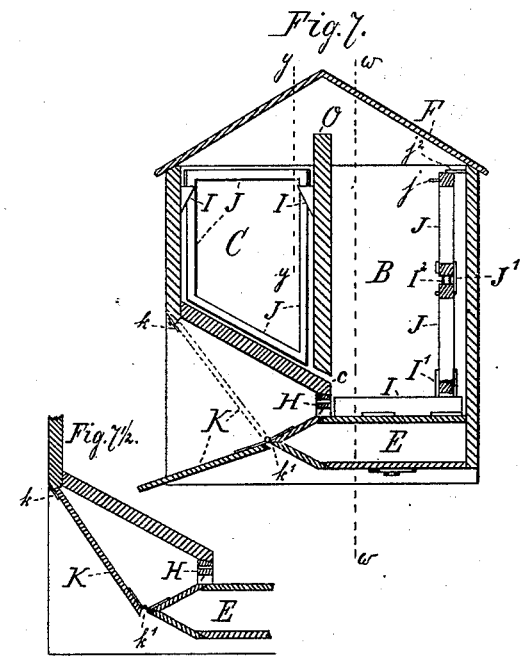
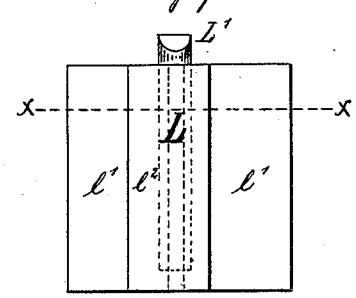
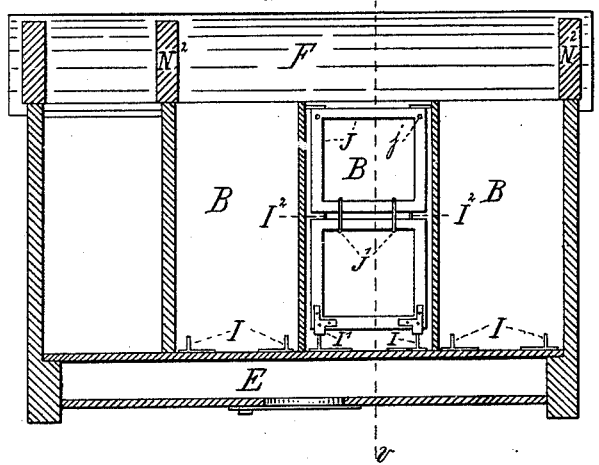
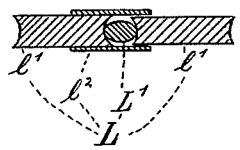

3 Sheets—Sheet 3.
G. W. SHARP.
Bee-Hive.
No. 223,067. Patented Dec. 30, 1879.
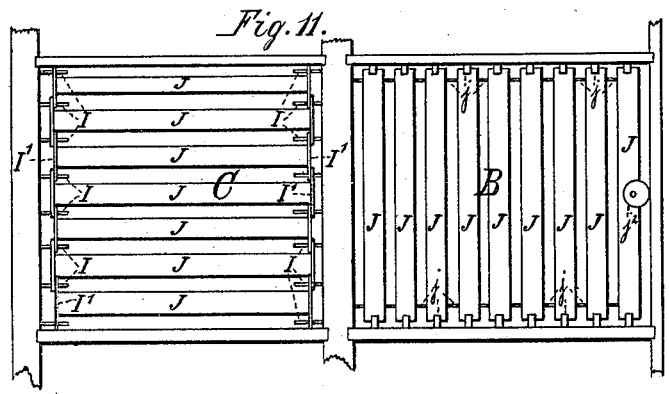
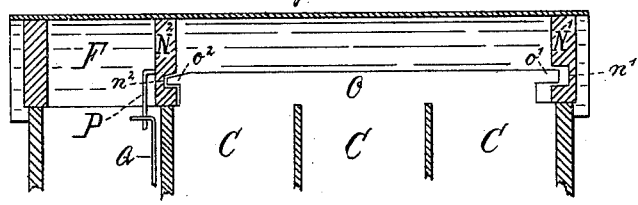
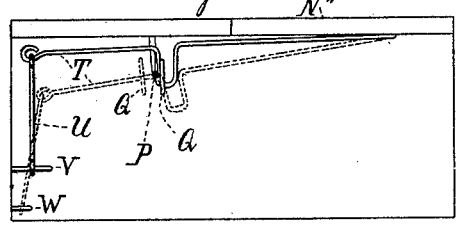
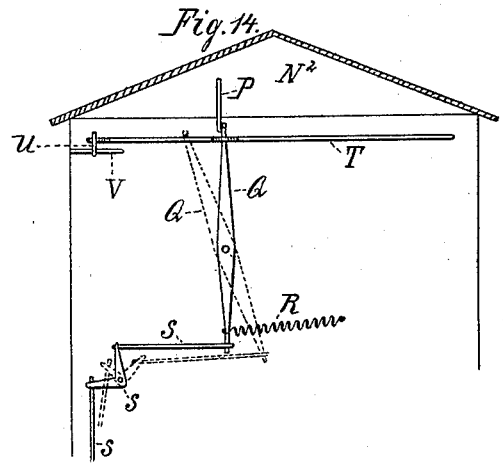
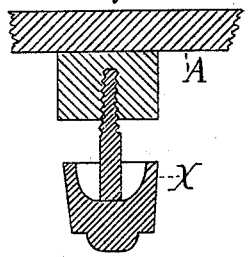
WITNESSES.
James B. Lizius
R. P. Daggett
INVENTOR.
George W. Sharp,
PER
C. Bradford.
ATTORNEY.

UNITED STATES PATENT OFFICE.

GEORGE W. SHARP, OF ROCKVILLE, INDIANA.

IMPROVEMENT IN BEE-HIVES.

Specification forming part of Letters Patent No. 223,067, dated December 30, 1879; application filed May 5, 1879.

*To all whom it may concern:*

Be it known that I, GEORGE W. SHARP, of the town of Rockville, county of Parke, and State of Indiana, have invented certain new and useful Improvements in Combination Bee-Hives, of which the following is a specification, reference being had to the accompanying drawings, which are made a part hereof, and on which similar letters of reference indicate similar parts.

Figure 1 is a perspective view of my hives when fully roofed in and surrounded with packing as in winter. Fig. 2 is an end elevation of the same. Fig. 3 is a top or plan view of the hives, packing-boxes, and other compartments in the same position as in Fig. 1, but with the roofs removed. Fig. 4 is an end view of the two rows of hives separated as in the summer or working season. Fig. 5 is a detail view, on an enlarged scale, of the bee-entrances to the hives. Fig. 6 is a front elevation of a portion of one of the rows of hives when open as in the working season. Fig. 7 is a transverse vertical section, on the line $v\ v$ in Fig. 8, of one of the hives and its accompanying compartments and devices. Fig. 8 is a longitudinal vertical section on the line $w\ w$ in Fig. 7. Fig. 9 is a side elevation of my adjustable division-board. Fig. 10 is a horizontal section thereof on the dotted line $x\ x$. Fig. 11 is a plan view on a larger scale of a portion of Fig. 3, with the covers removed from the hives, thus showing the honey-frames. Fig. 12 is a longitudinal vertical section, on the dotted line $y\ y$ in Fig. 7, of a portion of the device and illustrating my roof attachment. Fig. 13 is a plan view of the mechanism by which a movement of the roof, as by thieves attempting to open the hives, operates to set off an alarm located in the owner's house, or at some point where he would be likely to hear it. Fig. 14 is an elevation of the mechanism of which Fig. 13 is a plan. Fig. 15 is a vertical section upon the dotted line $z\ z$ in Fig. 6 of the feet upon which I preferably mount the stands upon which to set my bee-hives.

The vertical sections above specified are all drawn as seen when looking toward the right from the dotted lines mentioned in connection therewith.

In said drawings the various portions are marked with letters of reference, as specified in the following description.

A A are the stands upon which the hives rest. B B are the hives proper. C C are compartments in front of the hives, which serve as boxes for the bees to store surplus honey in in summer, and to contain chaff, straw, sawdust, or other suitable packing to keep the bees from freezing in winter.

D D are compartments built against the ends of the two rows of hives when they are placed together, as shown in Figs. 1, 2, and 3, in which packing is also placed in the winter season.

The hives are also constructed with a double bottom, which admits of packing being placed underneath.

The upper story of the hives proper may also contain packing in the winter season, and as the two rows of hives set back to back the bees are completely protected on all sides from the severity of the weather during the time they are left in this position.

Where it is not desired to separate the two rows of hives, both backs may be in one piece.

E E are the packing-spaces.

F $F'$ $F'$ $F^2$ are the several pieces of which the roof to the hives and side compartments is composed. The piece $F^2$ is only used when both rows of hives are placed under one roof, as shown in Figs. 1 and 2, where its use is clearly indicated. When the rows of hives are separated, as shown in Fig. 4, the pieces $F'$ $F'$ form one roof, and the piece F the other.

$D'$ $D'$ are the roof-pieces to the compartments D D. The pieces forming the sides and ends of these compartments are relatively arranged to each other and to the rows of hives in the manner shown most clearly in Fig. 3, so that the bolt-rods G G hold the structure securely together during the cold weather, and permit it to be readily taken apart upon the arrival of the proper season without damage to any of the parts.

H H are the entrances to the hives, which are divided by metal points $h'$ $h'$ into spaces only large enough to freely admit the bees, so as to prevent the entrance of mice, bee-moles, and similar vermin.

In order to guard against the attacks of robber-bees, I form a few supplemental entrances, $h^3\ h^3$, of which so many are used on such occasions as circumstances seem to warrant, the main entrances being meanwhile entirely closed.

Ventilating-holes $h^2\ h^2$ are preferably formed just above the entrance-spaces, which may be protected with wire-cloth. As will be plainly seen by reference to Fig. 7, all these entrances lead directly into the hives proper, from which openings $c$ lead into the compartments C, through which the bees enter said compartments during the working season. In the winter season said openings are closed.

I I are metal edges, fastened either to the bottom or sides of the hives or working-compartments, upon which the honey-frames rest or are suspended from.

J J are the honey-frames, also provided with metal-edge attachments I' I', which cross those attached to the hives, and thus the only connection between the frames and the hives are metal edges crossing each other, or small projections $jj$, and the eccentric button $j^2$, which keep the frames at the proper distance from the hives and from one another. By this arrangement, and by constructing the frames enough smaller than the hives so that they cannot fasten them at the sides, the bees are prevented from gluing the frames and hives together, which they will do when they have opportunity, and which renders it difficult to remove the frames and honey. Bees are averse to working on metal surfaces, at best, and could not fasten two narrow edges crossing each other together strongly enough to do any harm if they should attempt it.

It being desirable that the walls of the hives should be thin, I construct the pieces I, upon which a portion of the frames J hang, so as to project toward the center of the hive rather than upwardly from rabbets or offsets in the walls, which can only be formed when said walls are thicker and more cumbersome. The projections are also neater and cheaper than such rabbets would be, and more effectually accomplish the purpose.

The hives shown are double-height or two-story hives, and contain two tiers of honey-frames. These are also separated from each other by metal pieces $I^2$, attached to one, and with the edge resting upon the other. In the summer season an upper and lower frame of each tier is connected together, as shown in Figs. 7 and 8, by removable bands J', so that when one of the top tier is lifted the one in the lower tier directly under it shall come with it. In the winter season these frames are disconnected, and those in the upper tier removed. Covers are then put over the lower story or brood-nest, in which the bees remain, and the upper story is filled with packing, which, with packing previously described, entirely surrounds the bees, except at the hive-entrances.

K K are boards hinged to the lower part of the hives just below the entrances, upon which the bees alight upon their return from the fields. In winter they are intended to be closed, as shown in Figs. 1 and 7½, and also by the dotted lines in Fig. 7, except when it is necessary to give the bees an airing. These boards are so hinged that an open space, $k'$, will be left at the lower edge when they are closed, and ventilation in winter is thus provided for. The open space inclosed by said boards serves to equalize the temperature around the entrances, and prevents the bees from being attracted out by the sunshine when the weather is too cold for their safe appearance. Straying and restless bees can also enter the opening $k'$. The edge of the board projects below the opening, and thus serves as a wind-break, as shown in Fig. 7½.

L is an adjustable partition-board, which is used to divide the hives when from any reason a less space than the entire hive is desired to be occupied. It is constructed of two similar pieces, $l'\ l'$, one of which has side pieces, $l^2\ l^2$, and both of which, preferably, have concave sides. A bar, L', the cross-section of which is in the form of an ellipse, is inserted between them. When this bar has its shortest diameter toward the edges of the boards, the device may move freely about in the hive; but upon the bar being turned, the parts $l'\ l'$ are pressed firmly against the sides of the hive, the size of which is thus reduced to a greater or less extent, according to the position in which the division-board is placed. A wedge of suitable form would effect the same purpose as the elliptical bar, and is regarded by me as a substantial equivalent therefor. At the end of each of the series of hives is usually left a space, M, as shown in Fig. 3, in which mechanism, connecting the hives with an alarm in the owner's house, or elsewhere, is to be placed, and which is so arranged that the disturbing of the roof will operate said mechanism to set off said alarm. Thieves will thus be detected at once in any attempt to steal bees or honey.

The mechanism and the roof attachments are illustrated in Figs. 12, 13, and 14. In Fig. 12, $N'\ N^2$ are cross-pieces in the roof, in which are mortises $n'\ n^2$. O is a bar, attached, preferably, to the top of the partition which divides the hives B B from the compartments C C, and which has tenons $o'\ o^2$. The tenon $o'$ is made so that it enters the mortise $n'$ only part way when the roof is in its correct position, and thus allows said roof to move endwise far enough to allow the tenon $o^2$ to escape from the mortise $n^2$. When it is desired to remove the roof this is done, and the roof is lifted high enough, so that the cross-piece $N^2$ will be above the bar O, when it can be moved in the other direction far enough to escape the tenon $o'$, which leaves it entirely free from any attachment.

Projecting downwardly from the cross-piece $N^2$ is a pin, P, which is just long enough to engage with the lever Q, to which is attached the train of wires or cords connecting with the alarm, and any disturbing of the roof, when this connection is properly made, will release this lever, (which may be operated by a spring, R, or any similar device,) and thus set off the alarm.

S S S are wires and elbow-connections leading to the alarm of the ordinary kind. T is a catch to hold the lever in place while the roof is off the hive. In Fig. 13 it is shown in the position which accomplishes this object, and by dotted line in the position in which it is placed when the roof is on and the alarm is set. The lever Q is also shown in its ordinary position, and by means of dotted lines in the position which it occupies when the alarm is set off. This lever is also shown by like means in both positions in Fig. 14.

After the roof is in its place, if it is wished to set the alarm the hook U is reached through an opening, U′, (shown in Fig. 4,) and changed from the pin V, where it at other times rests, to the pin W. The lever is then only held by the pin P, attached to the roof, and should a thief attempt to lift or slide the latter the lever would fall to the position shown by the dotted lines, and the alarm would be released.

The feet X X to the stands are provided with cup-like cavities, as shown in the sectional view, Fig. 15, in which water or other substance may be placed, which ants and other vermin cannot readily pass, and thus prevent such pests from reaching the hives.

My improvements are mostly made with a view of combining under a single roof a considerable number of hives. Such an arrangement admits of thin dividing-walls, which can be made still thinner from the fact that metal points I I, on which to hang the honey-frames, are used instead of recesses or offsets in said walls.

The advantage of thin walls, besides being more economical, is that the bees are closer together, and consequently contribute toward the general warmth of the hive to a greater extent than when kept farther apart by the thicker walls in common use.

Having thus fully described my said invention, what I claim as new, and desire to secure by Letters Patent, is—

1. The combination, with two rows of bee-hives, of the end compartments, D D, constructed as shown, and held together by the bolts G G, substantially as and for the purpose specified.

2. The combination, with the honey-frames J, of the projections $jj$ and the eccentric wheel or button $j^2$, by which said frames are held at the proper distance from the hives and from each other, substantially as shown and specified.

3. The combination, with the cross-pieces N′ N², of the roof of a bee-hive, having mortises $n'$ $n^2$, of the bar O, attached to the body of the hive, and having the tenons $o'$ $o^2$, all arranged and operating substantially as and for the purpose specified.

4. In a bee-hive alarm mechanism, the combination, with the catch T for the lever Q, of the hook U and pins V and W, substantially as and for the purpose specified.

5. The combination of the parts $l$ $l$ and the elliptical rod L′, or its described equivalent, forming an adjustable division-board, L, for a bee-hive, substantially as herein shown and specified.

6. In the roof of a combination bee-hive, the parts F, F′, and F′, constructed to form two separate roofs for two series of hives when apart, substantially as shown and specified.

7. The combination of two rows of bee-hives adapted to be separated in summer, so that more convenient access may be had thereto, and to be brought together under one roof in winter, and there secured by inclosing ends, as shown, so that the combined warmth of the bees therein will conduce to prevent them from freezing, substantially as herein shown and specified.

In witness whereof I have hereunto set my hand and seal at Rockville, Indiana, this 29th day of April, A. D. 1879.

GEORGE W. SHARP. [L. S.]

In presence of—
JOHN B. DOWD,
MADISON KEENEY.